United States Patent [19]
Barker, Jr.

[11] Patent Number: 4,585,643
[45] Date of Patent: Apr. 29, 1986

[54] PROCESS FOR PREPARING CHLOROSILANES FROM SILICON AND HYDROGEN CHLORIDE USING AN OXYGEN PROMOTER

[75] Inventor: Thomas H. Barker, Jr., Vancouver, Wash.

[73] Assignee: Union Carbide Corporation, Danbury, Conn.

[21] Appl. No.: 739,681

[22] Filed: May 31, 1985

[51] Int. Cl.$^4$ ............................................. C01B 33/08
[52] U.S. Cl. ...................................................... 423/342
[58] Field of Search .......................................... 423/342

[56] References Cited

U.S. PATENT DOCUMENTS

| 3,104,104 | 11/1972 | Bawa et al. | 423/342 |
| 3,148,035 | 9/1964 | Enk et al. | 23/284 |
| 4,092,446 | 5/1978 | Padovani et al. | 427/313 |
| 4,130,632 | 12/1978 | Braunsperger et al. | 423/342 |
| 4,374,110 | 2/1983 | Darnell | 423/342 |

FOREIGN PATENT DOCUMENTS 1102119  3/1961  Fed. Rep. of Germany.
 945618  1/1964  United Kingdom.

OTHER PUBLICATIONS

Brit. Chem. Eng., vol. 11, No. 9, 927–927 (Sep. 1966).
DeCooker et al., J. Organometallic Chem., 84, 305–316 (1975).
*Silicon Compounds*, vol. 20, 881–887.

*Primary Examiner*—Peter D. Rosenberg
*Attorney, Agent, or Firm*—P. W. Leuzzi

[57] ABSTRACT

Chlorosilanes with an enhanced hydrogen content are selectively produced in the direct reaction of silicon with hydrogen chloride at elevated temperatures by treating the silicon with a source of oxygen during the process. A process is also provided for producing selectively trichlorosilane by reacting hydrogen chloride with a fluidized bed of silicon particles and treating the silicon particles with the source of oxygen.

13 Claims, No Drawings

PROCESS FOR PREPARING CHLOROSILANES FROM SILICON AND HYDROGEN CHLORIDE USING AN OXYGEN PROMOTER

BACKGROUND OF THE INVENTION

1. Field of the Invention

The present invention relates to a process for selectively producing chlorosilanes with an enhanced hydrogen content and, in particular, to an improved process for selectively providing enhanced yields of trichlorosilane utilizing oxygen promotion of silicon in a direct synthesis reaction between hydrogen chloride and silicon.

2. Description of the Prior Art

Chlorosilanes are conveniently prepared by the direct reaction of hydrogen chloride with silicon metal at elevated temperatures. The products of the reaction include: monochlorosilane, dichlorosilane, trichlorosilane, silicon tetrachloride and hydrogen as illustrated in the following generic equation for the reaction:

$$Si + HCl \rightarrow H_xSiCl_{4-x} + H_2$$

wherein x is an integer from 0 to 3. In general, chlorosilanes containing hydrogen tend to have a higher commercial value than silicon tetrachloride. Such compounds are especially useful in the synthesis of organosilicon compounds and organo functional chlorosilanes. Trichlorosilane is also a starting material for producing semiconductor grade silicon. The demand for organosilicon compounds and semiconductor grade silicon is increasing rapidly.

The direct synthesis reaction between silicon and hydrogen chloride to produce trichlorosilane was first reported in 1857. As practiced commercially today, the distribution of chlorosilanes in the product stream may typically be as follows:

| Chlorosilane | Amount (Weight %) |
|---|---|
| monochlorosilane ($H_3SiCl$) | <0.1 |
| dichlorosilane ($H_2SiCl_2$) | <0.5 |
| trichlorosilane ($HSiCl_3$) | about 80–90 |
| silicon tetrachloride ($SiCl_4$) | about 10–20 |

Although the yield of trichlorosilane may be higher at the start of the reaction, it tends to decrease over time (see Example 1 below).

The direct synthesis of trichlorosilane by the reaction of silicon with hydrogen chloride is also described in the following prior art:

| Country | U.S. Pat. No. | Issue Date |
|---|---|---|
| U.S. | 3,148,035 | September 8, 1964 |
| U.S. | 3,704,104 | November 28, 1972 |
| U.S. | 4,130,632 | December 19, 1978 |
| Great Britain | 945,618 | January 2, 1964 |
| Germany | 1,102,119 | March 16, 1961 |

The direct synthesis reaction between hydrogen chloride and silicon, which is normally conducted at elevated temperatures, typically from 200° to 500° C., is highly exothermic. Highly exothermic reactions tend to cause hot spots within a reaction mix. Accordingly, it is essential to efficiently remove such heat to control the temperature of the reaction. Further, as the reaction temperature increases, it is well understood that the quantity of trichlorosilane produced decreases, while the content of silicon tetrachloride produced increases.

To control the excess heat of reaction it has been proposed to provide a stirred bed, an expanded bed an agitated bed or a fluidized bed reactor. Processes for producing trichlorosilane by reaction of silicon with hydrogen chloride employing a fluidized bed are disclosed in the above-listed U.S. and foreign patents. For example, in British Patent 945,618 trichlorosilane was produced in yields on the order of 90% by the reaction of silicon and hydrogen chloride in a fluidized bed.

In U.S. Pat. No. 4,092,446, issued May 30, 1978, a fluidized bed reactor is disclosed for producing trichlorosilane employing an internal heat exchanger to help dissipate the heat of reaction. In *British Chem. Eng.*, Vol. 11, 9 (September 1966), pages 927-929, a fluidized bed process is disclosed for producing trichlorosilane at a reaction temperature of 300° C. and at atmospheric pressure.

In general, the art has attempted to enhance the production of trichlorosilane during the direct synthesis reaction between silicon and hydrogen chloride by attempting to achieve proper temperature control in the reactor. Until now, such procedures have not been completely successful.

Oxygen, at concentrations of 1-500 ppm, was found to slightly decrease the relative selectivity of dimethyldichlorosilane in the direct reaction of methyl chloride with silicon metal; the decrease in selectivity increased as the oxygen concentration increased (J. Organometallic Chemistry, 84 (1975) 305-316).

SUMMARY OF THE INVENTION

The present invention is an improvement in the process for producing chlorosilanes of the formula $H_xSiCl_{4-x}$, wherein x is an integer from 0 to 3, by the direct reaction of silicon with hydrogen chloride at elevated temperatures. The improvement comprises treating the silicon with a source of oxygen to form selectively chlorosilanes which contain hydrogen, particularly trichlorosilane. The process of the invention is capable of enhancing the yield of trichlorosilane and, to a lesser extent, dichlorosilane, while reducing the yield of silicon tetrachloride.

DESCRIPTION OF PREFERRED EMBODIMENTS

As employed herein, the phrase "source of oxygen" includes oxygen itself, air or any oxygen-containing compound which can decompose under the conditions of the reaction to provide oxygen without an adverse effect on the reactants or the reaction product. Water, hydrogen peroxide and reducible metal oxides and carbonates (e.g., ferric oxide and zinc carbonate) are examples of such oxygen-containing compounds.

It has been found that silicon can be beneficially treated with oxygen prior to or at any stage in the process to enhance the selectivity of the direct synthesis process toward chlorosilanes which contain hydrogen, at the expense of silicon tetrachloride product.

In a preferred embodiment, the present invention comprises a process for the selective synthesis of trichlorosilane comprising directly reacting hydrogen chloride with a fluidized bed of silicon particles and treating the silicon particles with a source of oxygen prior to the completion of the reaction.

The oxygen treatment (or oxygenation) of the silicon particles may be conducted prior to the reaction, intermittently during the reaction or both times.

The present process may be conducted in a stirred bed reactor, an agitated reactor or, more preferably, in a fluidized bed reactor. In general, the reaction system should be open; that is, arrangements should be made for the continuous withdrawal or removal of the products of the direct synthesis. This may be accomplished by employing conventional techniques and equipment. A conventional means of cooling and condensing the hot product mixture in a vessel separate from, but directly attached to, the gas-solid reactor, may also be provided.

It is necessary that the silicon particles be maintained in a state of agitation, that is, stirred, expanded or fluidized, so as to facilitate heat-and mass-transfer and to avoid hot spots in the reaction medium. Other operational details pertinent to gas-solid reactors are well-known to those skilled in the art and need not be fully described herein.

In one embodiment of the invention, the selectivity of the direct synthesis reaction for producing trichlorosilane is increased, by pre-treating the silicon reactant with an oxygen source prior to its reaction with hydrogen chloride. As the synthesis reaction proceeds and the oxygen incorporated in the silicon is reduced, the reaction selectivity toward trichlorosilane and dichlorosilane is correspondingly reduced to that level achieved with untreated silicon. In order to restore the desired selectivity, it is preferred to further treat the silicon reactant, in whole or in part, with additional oxygen. This embodiment of the inventive process can be conducted conveniently in a fixed bed, stirred bed, agitated bed, expanded bed or fluidized bed reactor.

In a more preferred embodiment, the direct synthesis reaction and the silicon oxygenation are conducted in a fluidized bed system. In that system, the silicon reactant is preferably technical grade material containing from about 90 to 98% by weight silicon, and, more preferably, 98% by weight silicon, with the remainder composed of such elements as iron, calcium, magnesium, aluminum, tin, boron, copper, chromium, zinc, titanium, cadmium, bismuth and lead as well as other impurities. If desired, preformed metal silicides, such as those of iron, calcium, magnesium and copper may also be employed in the synthesis. The preferred silicon reactant is 98% silicon particles with up to 1% iron, up to 0.5% aluminum and up to 0.07% calcium. The silicon particles need not be activated by doping prior to use. If desired, however, activated silicon particles can also be employed.

A broad range of particle sizes, for example, 28×D mesh (no more than about 600 microns) may be employed in the reaction. However, it is generally preferred that the silicon particles be smaller than about 48 mesh (less than about 300 microns). Smaller particle sizes contribute to good fluidization of the bed and assist heat transfer. The particular size employed in any given reaction will depend upon the size of the reactor and the scale of the synthesis. In laboratory experiments, the preferred particle size range was 65×150 mesh i.e.,(104-208 microns), but this size distribution is not necessary for the success of the process.

The total amount of hydrogen chloride employed in the invention should generally be, as a minimum, sufficient to fluidize the silicon particles and must, of course, be less than the flow which completely discharges or elutriates the silicon particles from the bed before they are reacted. The minimum flow for fluidization can be computed from a knowledge of the gas densities, the density and particle size distribution of the silicon particles and the temperature of the reaction, as described, for example, in the monograph, *Fluidization Engineering* by D. Kunii, et al., John Wiley & Sons, New York, (1969).

For the laboratory preferred average particle diameter of about 149 microns and for the preferred reaction temperatures (from about 300°–325° C.), the minimum superficial linear fluidization velocity is about 1.5 cm/sec. Operational values at 2 to 5 times this flow are preferred.

The hydrogen chloride reactant must be in contact with the silicon particles to realize the successful direct synthesis of the desired chlorosilanes. In general, at the preferred fluidization velocities, space times of about 5 seconds to about 5 minutes are obtained, and are therefore preferred, depending on the height of the fluidized bed of silicon particles.

In order to treat the silicon particles with a source of oxygen, it is preferred to initially fluidize the silicon particles with oxygen, air or moisture, followed by reaction with hydrogen chloride until the trichlorosilane selectivity starts to decrease. Thereafter, it is preferred to intermittently fluidize the silicon particles with oxygen and hydrogen chloride until the silicon has been consumed.

Using the process of this invention, it has been found that the distribution of the resulting chlorosilane products is as follows:

| Ingredient | Amount (Weight %) |
|---|---|
| dichlorosilane ($H_2SiCl_2$) | about 0.1 |
| trichlorosilane ($HSiCl_3$) | 90–97 |
| tetrachlorosilane ($SiCl_4$) | 3–10 |

These yield are obtained even after operating the reaction over a period of time; the observed decrease in trichlorosilane yield with time is less when the process of the invention is practiced (compare Examples 1 and 2 below).

Ordinarily, the amount of monochlorosilane is very small (as low as trace amounts).

The amount of oxygen provided to the process of the invention is not critical. In general, sufficient amounts of oxygen are employed to enhance the selectivity of the process to chlorosilanes containing hydrogen and particularly, and in a preferred embodiment, to maintain the yield of trichlorosilane high.

The minimum reaction temperature of the direct process of the invention is set by the minimum temperature at which the silicon reacts with the hydrogen chloride. The maximum temperatures are determined by the temperatures at which pyrolysis of the reactants or products occurs. In general, the operational temperature range for the process of the invention at atmospheric pressure is from about 200° to 500° C., and, preferably, from about 280° to 400° C.

The process of the present invention may be conducted at atmospheric pressure or above atmospheric pressures. The particular pressure at which the process is operated is not critical and those skilled in the art can select the appropriate pressure. In general for an industrial fluidized bed process, operating pressures are preferably greater than 50 psig.

In a preferred embodiment of the invention the reaction mixture is at least periodically analyzed (e.g. by gas chromatography) to determine the selectivity of the process to trichlorosilane. Once the selectivity begins to decrease, it is preferred to subject the silicon particles to the oxygenation treatment of the invention.

Of course it is to be understood that storage containers, reactors, transport lines, pumps, valves and other fittings employed in the apparatus to effect the reactions of the instant invention, all of which are conventional, and which come into contact with, or are reasonably expected to come into contact with the hydrogen chloride reactant and the chlorosilane reaction products of this invention, must be corrosion resistant, especially at the preferred temperatures.

The following examples illustrate the conventional direct reaction process and certain preferred embodiments of the present invention under laboratory conditions. They are not intended to limit the scope of the invention; rather, they are presented merely to facilitate practice of the invention by those of ordinary skill in the art.

EXPERIMENTAL PROCEDURE

All experiments were conducted in a laboratory Vycor fluidized bed reactor having an overall length of 66 cm. The upper 10 cm of the reactor was an expanded head, 6.5 cm internal diameter, while the lower 56 cm had an internal diameter of 3.3 cm. The bed height, when fluidized, was 37 cm, thus giving a length/diameter, L/D, ratio of 11. An air-driven vibrator was sometimes used to assist fluidization. A sintered glass frit at the bottom of the reactor supported the silicon particles and dispersed the gases as they entered the bed. Heating wire and fiberglass insulation were wrapped along the entire length of the reactor. Two Pyrex thermowells were placed vertically through the top of the reactor into the bed of the silicon particles. One thermocouple provided feedback to the heater/controller device, the other was attached to a digital thermometer. A reservoir, vented with nitrogen, was attached to the reactor near its base just above the glass frit to permit the intermittent addition of additional silicon to the bed. The junction of the reservoir and the reactor was normally kept closed by a valve. The reactor was connected to a condensing chamber by a side-arm attached to the top of the expanded head section of the reactor. The condensing chamber was maintained at −63° C. to −78° C. with solid carbon dioxide and isopropanol. Condensed samples of the reaction products were withdrawn into weighed, chilled flasks. Unreacted hydrogen chloride was distilled off and the residue analyzed by gas chromatography and gas-chromatography/mass spectrometry.

The reagent gases were conveyed from their commercial cylinders to the reactor through stainless steel tubing. All flowmeters were calibrated with the appropriate gas volumetrically with a wet-test meter and/or gravimetrically by condensing and weighing metered quantities of liquified gas.

EXAMPLE 1 (PRIOR ART)

The reactor described above was charged with 200 gms of 65×150 Tyler mesh metallurgical grade silicon and heated to 325° C. with dry nitrogen as the fluidizing gas. The nitrogen flow was then shut off and simultaneously fluidization with hydrogen chloride was commenced at 600 scc/minute. Over the next two hours the HCl flowrate was increased to 700 scc/minute. During the 13 hour and 40 minute HCl addition, silicon was added hourly to maintain the silicon level constant. During the course of the experiment, 885.9 gms of crude was produced with an average trichlorosilane content of 87.49% by weight. Table I below shows how crude composition changed with mass ageing. The analyses were performed by gas chromatography.

TABLE I

| Time* (hours) | $H_2SiCl_2$ (% by wt) | $HSiCl_3$ (% by wt) | $SiCl_4$ (% by wt) | Heavies (% by wt) |
|---|---|---|---|---|
| 0.7 | 0.06 | 92.0 | 7.3 | 0.6 |
| 1.2 | 0.04 | 95.5 | 4.5 | trace |
| 2.2 | 0.02 | 95.3 | 4.6 | 0.1 |
| 3.3 | 0.02 | 93.4 | 6.6 | trace |
| 4.2 | 0.03 | 91.7 | 8.3 | trace |
| 5.2 | 0.04 | 90.3 | 9.6 | trace |
| 6.2 | trace | 89.0 | 10.8 | 0.1 |
| 6.7 | trace | 87.1 | 12.8 | trace |
| 7.7 | trace | 89.8 | 10.1 | 0.1 |
| 8.2 | trace | 85.9 | 13.9 | trace |
| 9.2 | trace | 82.3 | 15.6 | 1.9 |
| 10.2 | trace | 81.4 | 18.4 | 0.1 |
| 11.2 | trace | 87.2 | 12.7 | trace |
| 12.2 | trace | 81.8 | 18.0 | 0.1 |
| 13.2 | trace | 82.7 | 17.2 | 0.1 |
| 13.7 | trace | 87.7 | 12.2 | 0.1 |

*Time of HCl flow to reactor

EXAMPLE 2

The same reactor was charged and started up as in Example 1, except the hydrogen chloride flowrate was 1.0 liter/minute. Hydrogen chloride was added for 2.75 hours prior to a first 20 minute addition of an air/nitrogen mixture (air at 100 cc/minute with residual 900 cc/minute being nitrogen). During this air addition, no HCl was added to the reactor. After the air addition, HCl was again added to the reactor at the same rate for 1.5 hours before stopping the reaction. The reaction was started up again by increasing the reactor temperature to 280° C. with an air/nitrogen mixture before again beginning the HCl flowrate at 1 liter/minute. During the first half-hour the reactor temperature was raised to 325° C. and for the course of the reaction it was maintained between 295°–325° C. After 3.2 hours of HCl reaction, the HCl flow was stopped and the reactor purged with air and nitrogen as above for 10 minutes. HCl was then resumed for 2.75 hours. During the run no silicon was added to the reactor after the initial charge and 57.6% of the initial silicon charge was consumed. 418 gms of crude was produced with an average trichlorosilane content of 93.24% by weight. Table II below shows the crude composition as a function of time.

TABLE II

| Time* (hours) | $H_2SiCl_2$ (% by wt) | $HSiCl_3$ (% by wt) | $SiCl_4$ (% by wt) | Heavies (% by wt) | Comment |
|---|---|---|---|---|---|
| 0.5 | 0.03 | 96.27 | 3.61 | 0.09 | |
| 1.5 | 0.06 | 94.85 | 4.92 | 0.17 | |
| 2.0 | 0.06 | 96.59 | 3.33 | 0.02 | |
| 2.5 | 0.02 | 95.41 | 4.56 | 0.01 | |
| 2.7 | | | | | Added air/nitrogen |
| 3.7 | 0.02 | 95.06 | 4.83 | 0.09 | |
| 4.25 | trace | 92.8 | 7.20 | 0.01 | Added air/N₂ during heatup |
| 4.75 | 0.78 | 95.84 | 3.24 | 0.13 | |
| 5.25 | 0.39 | 94.61 | 4.90 | 0.09 | |
| 5.75 | 0.10 | 95.98 | 3.86 | 0.05 | |

TABLE II-continued

| Time* (hours) | H₂SiCl₂ (% by wt) | HSiCl₃ (% by wt) | SiCl₄ (% by wt) | Heavies (% by wt) | Comment |
|---|---|---|---|---|---|
| 6.75 | 0.04 | 90.94 | 8.91 | 0.11 | |
| 7.5 | trace | 89.9 | 9.9 | trace | Added air/N₂ for 10 min. |
| 7.75 | trace | 92.9 | 7.0 | trace | |
| 8.0 | 0.03 | 92.97 | 6.94 | 0.06 | |
| 8.30 | 0.02 | 92.93 | 7.0 | 0.03 | |
| 9.25 | 0.04 | 92.92 | 7.0 | 0.06 | |
| 10.25 | 0.05 | 93.2 | 6.7 | 0.05 | |

*Time of HCl flow to reactor

What is claimed is:

1. In the process for producing chlorosilanes of the formula $H_xSiCl_{4-x}$, wherein x is an integer from 0 to 3, by reacting silicon with hydrogen cholride at elevated temperatures, the improvement which comprises (a) treating the silicon with a source of oxygen to initially fluidize the silicon, (b) reacting the fluidized silicon with hydrogen chloride until selectivity decreases, and (c) thereafter intermittently fluidize the silicon with a source of oxygen to selectively form chlorosilanes which contain hydrogen.

2. The process of claim 1 in which the source of oxygen is oxygen gas.

3. The process of claim 1 in which the source of oxygen is air.

4. The process of claim 1 in which the source of oxygen is water.

5. The process of claim 1 including the additional steps of (i) removing at least a portion of the silicon from the process, (ii) oxygenating said removed silicon and (iii) returning the oxygenated silicon to the process.

6. The process of claim 5 including repeating steps (i), (ii) and (iii) intermittently in response to changes in selectivity of the process.

7. A process for preparing trichlorosilane comprising:
   (a) directly reacting hydrogen chloride and silicon by feeding hydrogen chloride gas through a fluidized bed of silicon particles at an elevated temperature;
   (b) treating said silicon particles with a source of oxygen; and
   (c) continuously withdrawing reaction products from the reaction.

8. The process of claim 7 in which the temperature of the reaction is maintained at from about 280° to 400° C.

9. The process of claim 7 in which the oxygen source is oxygen gas.

10. The process of claim 7 in which the oxygen source is air.

11. The process of claim 7 in which the oxygen source is water.

12. The process of claim 7 including the step of pretreating the fluidized bed of silicon particles with an oxygen source prior to conducting the reaction.

13. The process of claim 7 including the steps of monitoring the reaction to determine the selectivity of the process toward trichlorosilane and oxygenating at least a portion of the silicon particles in response to a reduction in the selectivity of the process toward trichlorosilane.

* * * * *